(12) United States Patent
Fortmann et al.

(10) Patent No.: US 10,485,381 B2
(45) Date of Patent: Nov. 26, 2019

(54) FOOD STORAGE CONTAINER WITH REMOVABLE PORTION

(71) Applicant: Carter Hoffman LLC, Mundelein, IL (US)

(72) Inventors: Robert C. Fortmann, Grayslake, IL (US); Frank G. Marolda, Vernon Hills, IL (US)

(73) Assignee: Carter-Hoffmann LLC, Mundelein, IL (US)

( * ) Notice: Subject to any disclaimer, the term of this patent is extended or adjusted under 35 U.S.C. 154(b) by 669 days.

(21) Appl. No.: 15/046,932

(22) Filed: Feb. 18, 2016

(65) Prior Publication Data

US 2016/0249770 A1    Sep. 1, 2016

Related U.S. Application Data

(60) Provisional application No. 62/126,184, filed on Feb. 27, 2015.

(51) Int. Cl.
*A47J 39/00*    (2006.01)

(52) U.S. Cl.
CPC .................. *A47J 39/003* (2013.01)

(58) Field of Classification Search
CPC ..... A47J 39/003; A47J 39/006; C07K 14/315; C12Q 1/689
USPC ......... 99/340, 376, 371, 377, 379, 380, 483; 206/218; 215/900; 220/9.2, 9.3, 666
See application file for complete search history.

(56) References Cited

U.S. PATENT DOCUMENTS

| | | | |
|---|---|---|---|
| 8,950,613 B2* | 2/2015 | Nolan | B65D 19/18 220/4.31 |
| 2003/0226453 A1* | 12/2003 | Home | A23B 4/052 99/450 |

OTHER PUBLICATIONS

Carter-Hoffmann, CNH18—CNH Series Crisp 'N Hold Crispy Food Stations, prior to Feb. 27, 2014, pp. 1-2.*

(Continued)

*Primary Examiner* — Dana Ross
*Assistant Examiner* — Joseph W Iskra
(74) *Attorney, Agent, or Firm* — Brinks Gilson & Lione

(57) ABSTRACT

A food storage container is provided. The container includes a housing with a bottom, a first side wall, and a second side wall fixed to the first side wall that defines a food storage volume therewithin. The first side wall extends from a first end portion that includes a first peg that extends therefrom in a direction parallel with a plane through the first side wall. A third side wall is removably mounted to the first peg, wherein when mounted to the first peg, the third side wall establishes a barrier of the food storage volume different than barriers of the food storage volume provided by the bottom, the first side wall, and the second side wall. When the third side wall is removed from the first peg, the food storage volume may be accessed through a void left by the removal of the third side wall.

11 Claims, 5 Drawing Sheets

(56) References Cited

OTHER PUBLICATIONS

Carter-Hoffmann Sell Sheet for CHN Series—Crisp 'N Hold Crispy Food Stations, 2 pp., Products described and depicted on Sell Sheet on sale in the U.S. prior to Feb. 27, 2014.
Carter-Hoffmann Sell Sheet for CNH28LP—Crisp 'N Hold Crispy Food Station, 2 pp.—Device constructed like that depicted and described in this Sell Sheet was disclosed to the public when displayed in Carter-Hoffmann's both at the NAFEM trade show in Orange County, California by Carter-Hoffmann in accordance with 35 U.S.C. 102(b)(1) on Feb. 19, 2015. Carter-Hoffmann is the assignee of the subject application and obtained the subject matter disclosed on Feb. 19, 2015 directly from the joint inventors (R. Fortmann and F. Marolda).

* cited by examiner

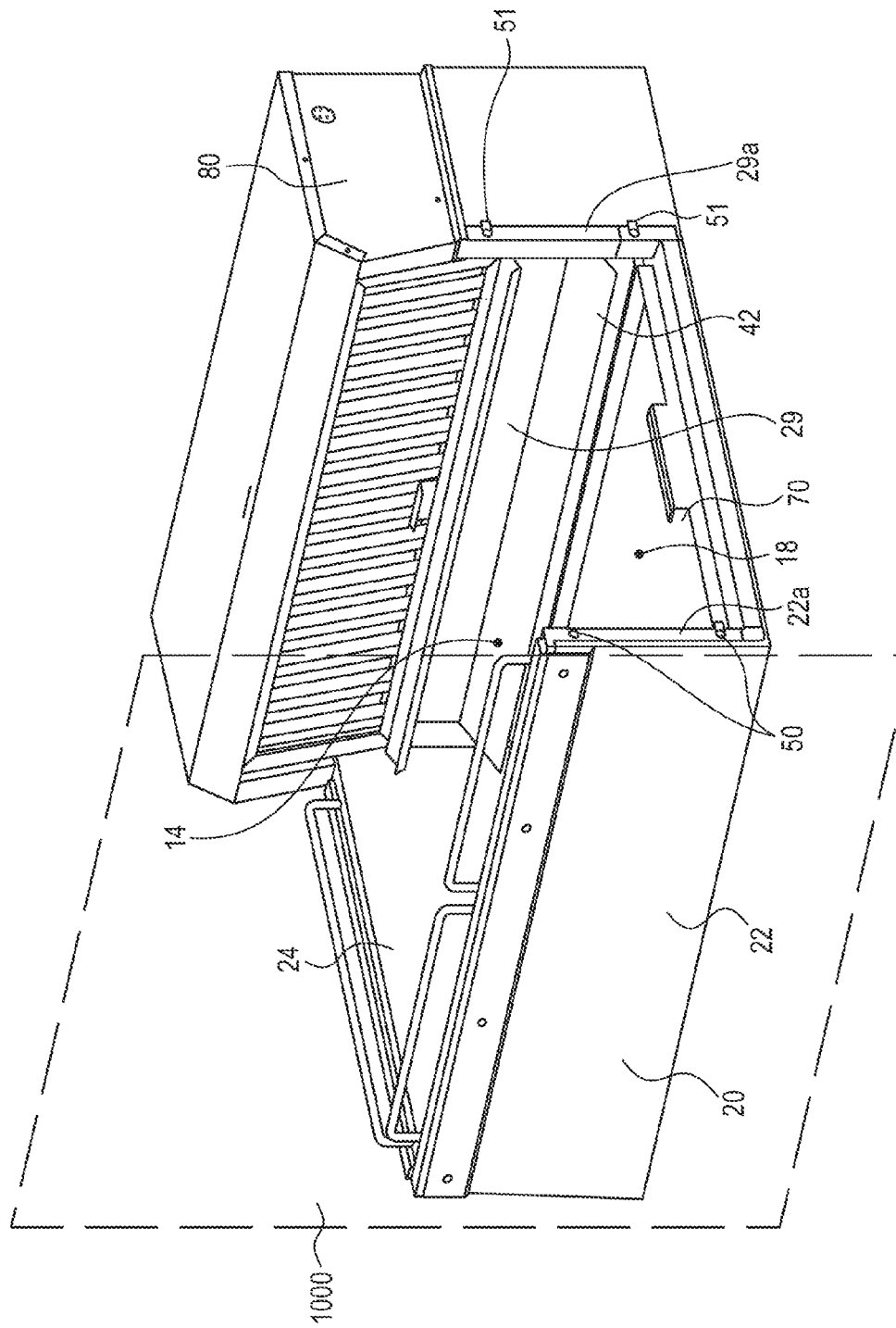

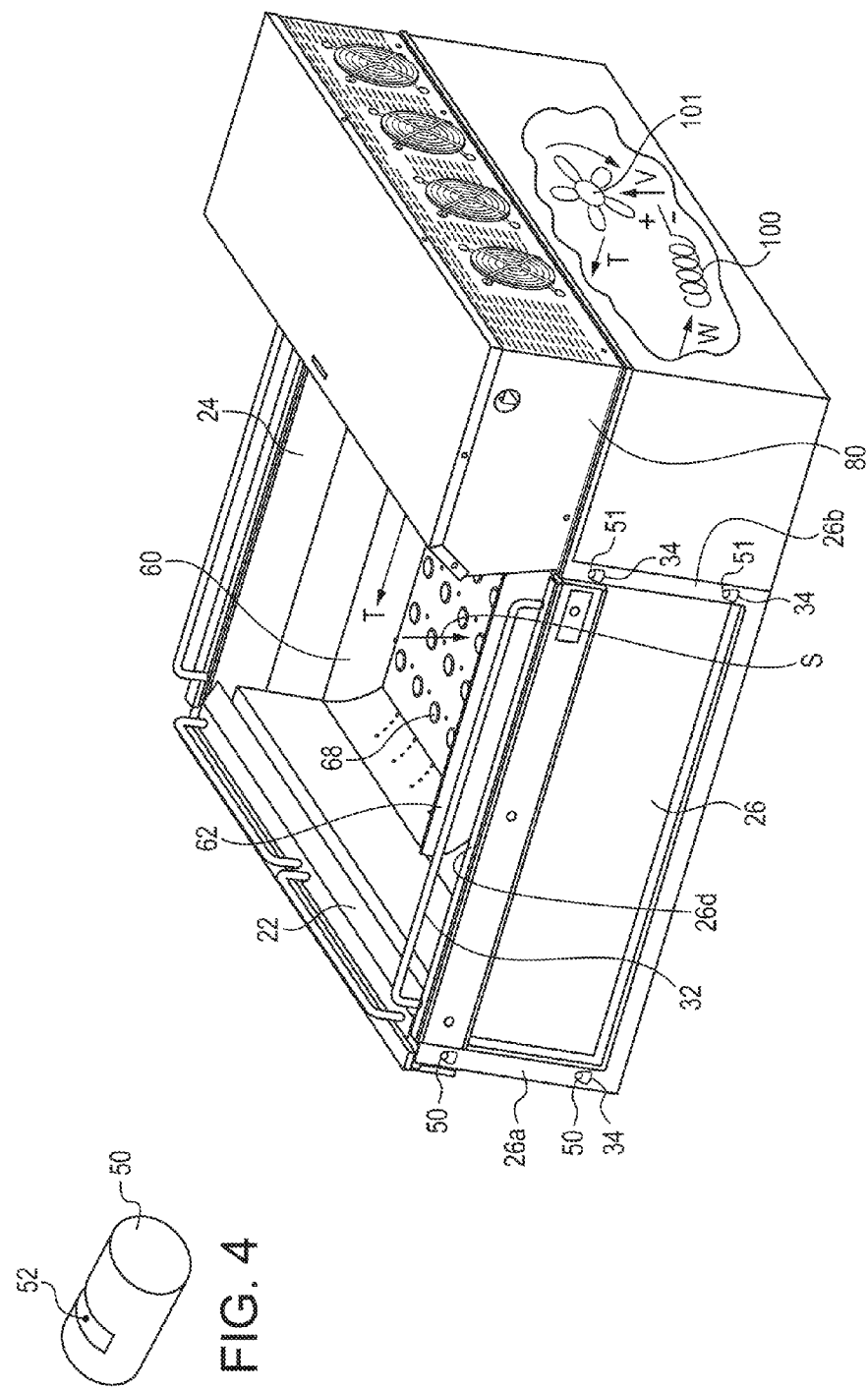

FOOD STORAGE CONTAINER WITH REMOVABLE PORTION

CROSS-REFERENCE TO RELATED APPLICATIONS

This application claims priority from U.S. Provisional Application No. 62/126,184, filed on Feb. 27, 2015, the entirety of which is hereby fully incorporated by reference herein.

BACKGROUND

This disclosure relates to equipment used in a commercial kitchen to cook and store prepared food prior to presentation to the customer.

BRIEF SUMMARY

A first representative embodiment of the disclosure is provided. The embodiment includes a food storage container. The food storage container includes a housing comprising a bottom, a first side wall, and a second side wall fixed to the first side wall, wherein the combination of the bottom and the first and second walls defines a food storage volume therewithin. The first side wall extends from a first end portion, wherein the first end portion includes a first peg that extends therefrom in a direction that is parallel with a plane through the first side wall. A third side wall is removably mounted to the first peg, wherein when mounted to the first peg, the third side wall establishes a barrier of the food storage volume different than barriers of the food storage volume provided by the bottom, the first side wall, and the second side wall. When the third side wall is removed from the first peg, the food storage volume may be accessed through a void left by the removal of the third side wall.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 3 is the view of FIG. 1 with the tray removed from the food storage volume.

FIG. 4 is a detail view of a peg that is usable with the food storage container of FIG. 1.

FIG. 5 is another perspective view of the food storage container schematically showing a heating element and ventilation fan that may be provided with the container.

DETAILED DESCRIPTION OF THE DRAWINGS AND THE PRESENTLY PREFERRED EMBODIMENTS

Figure 1:
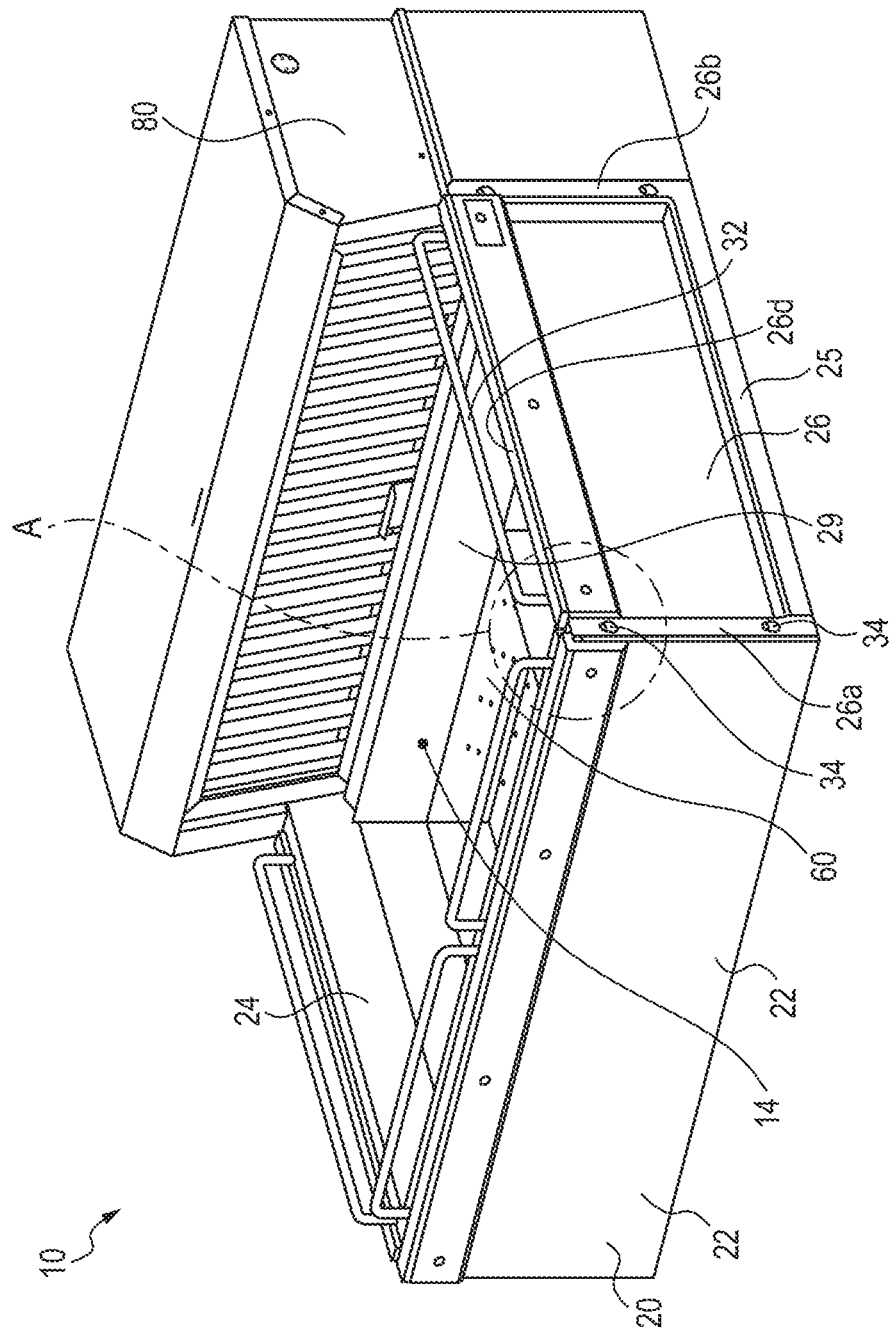
FIG. 1 is a perspective view of a food storage container.
Figure 1A:
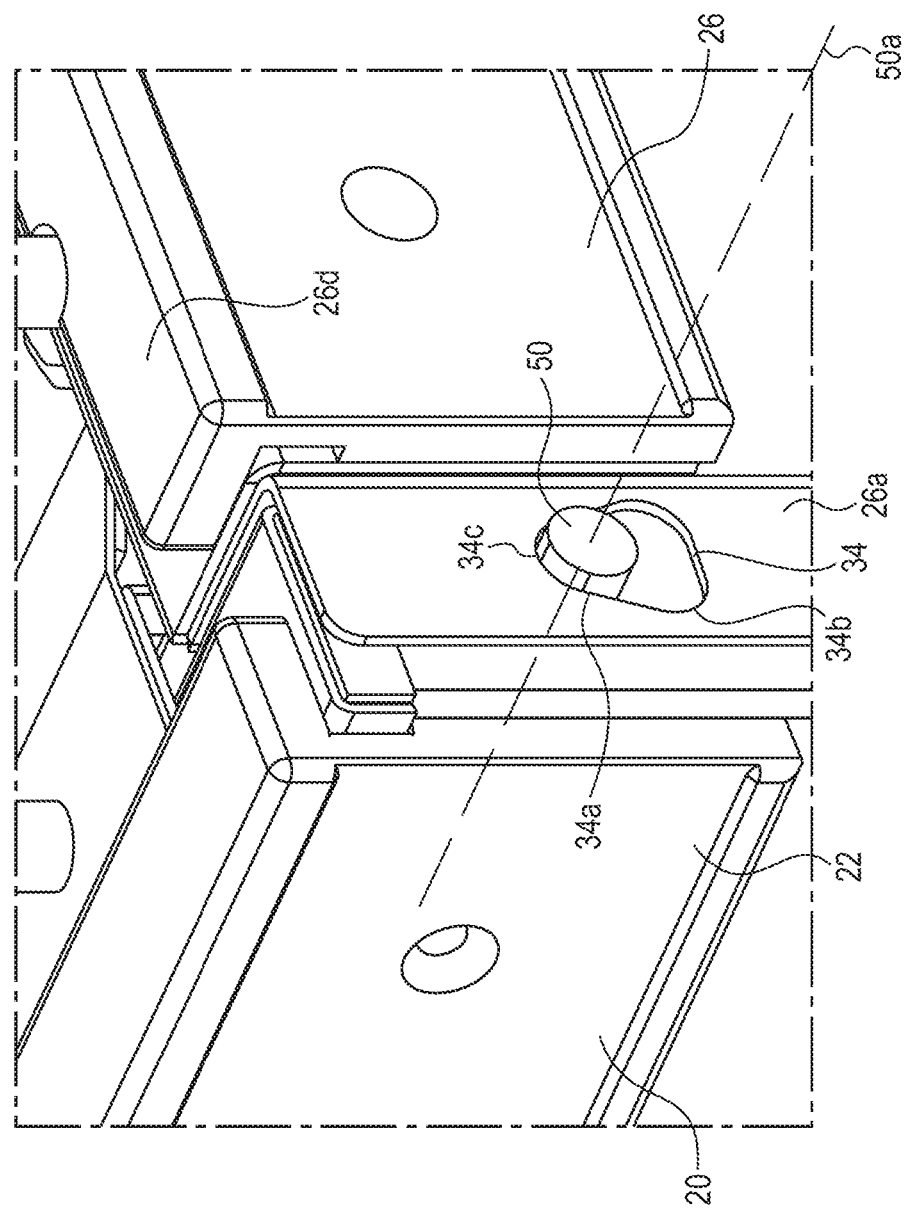
FIG. 1a is a detail view of detail A of FIG. 1 depicting the engagement of the peg and the aperture of the food storage container.

Turning now to FIGS. 1-5, a food storage container 10 is provided. The food storage container 10 may be an apparatus that is configured to hold previously cooked or prepared food products for a time period until the food product is served to the customer or further prepared. For example, the food storage container 10 may be useful to store food such as french fries, chicken fingers, or other items that are cooked in a deep fat fryer, or in other (or the same) embodiments, the food storage container 10 may be useful to store foods (such as vegetables, proteins, breads, and the like) that were cooked or baked in an oven before they are ultimately served to the customer. In some embodiments, the food storage container 10 may include a heat source and/or a forced air system to maintain the temperature and the moisture of the food product as it is being held in the container 10.

The food storage container 10 may be configured as a standalone component within a kitchen, or in some embodiments, the container 10 may be disposed next to various food cooking and preparation equipment that is used to cook and prepare the food product before it is placed into the container 10. For example, the food storage container 10 may be within a food preparation line that might include an oven, a fryer, a rethermalizer, or other components. Often the space within a kitchen and associated with a food preparation line is tight, with several food service professionals working within a small area in the food preparation line. The present disclosure may be beneficial to allow for an easy removal of a food tray 60 and drip pan 70 (discussed below) from the food storage container 10 for cleaning or other purposes while maintaining the compactness of the container 10 and the tight spacing of the container 10 and other equipment within the food preparation line.

The container 10 may include a housing 20 that includes a plurality of walls and a bottom 25 that collectively define an open food storage volume 14 therewithin. The food storage volume 14 may be defined a plurality of rigid walls, such as first and second side walls 22, 24, and a rear wall 29 which may be a portion of a compartment 80 that houses the electrical and mechanical components associated with the container 10, such as a heating element 100 (electric heater or gas burner) and a fan 101 or other air handling structure each shown schematically in FIG. 5. The open food storage volume 14 may be further defined by a removable wall 26 that can be fixed to the housing 20, such as with a connection to a first wall 22 and the rear wall 29 with the removable wall 26 forming a side wall of the housing 20. Alternatively, the removable wall 26 may be connected to two side walls when the removable wall 26 forms a front wall of the housing 20. The removable wall 26, when installed forms a barrier of the food storage volume 14 that is different from barriers that are provided by the bottom 25, the first side wall 22, the second side wall 24, and the rear wall 29 (when provided).

Figure 2:
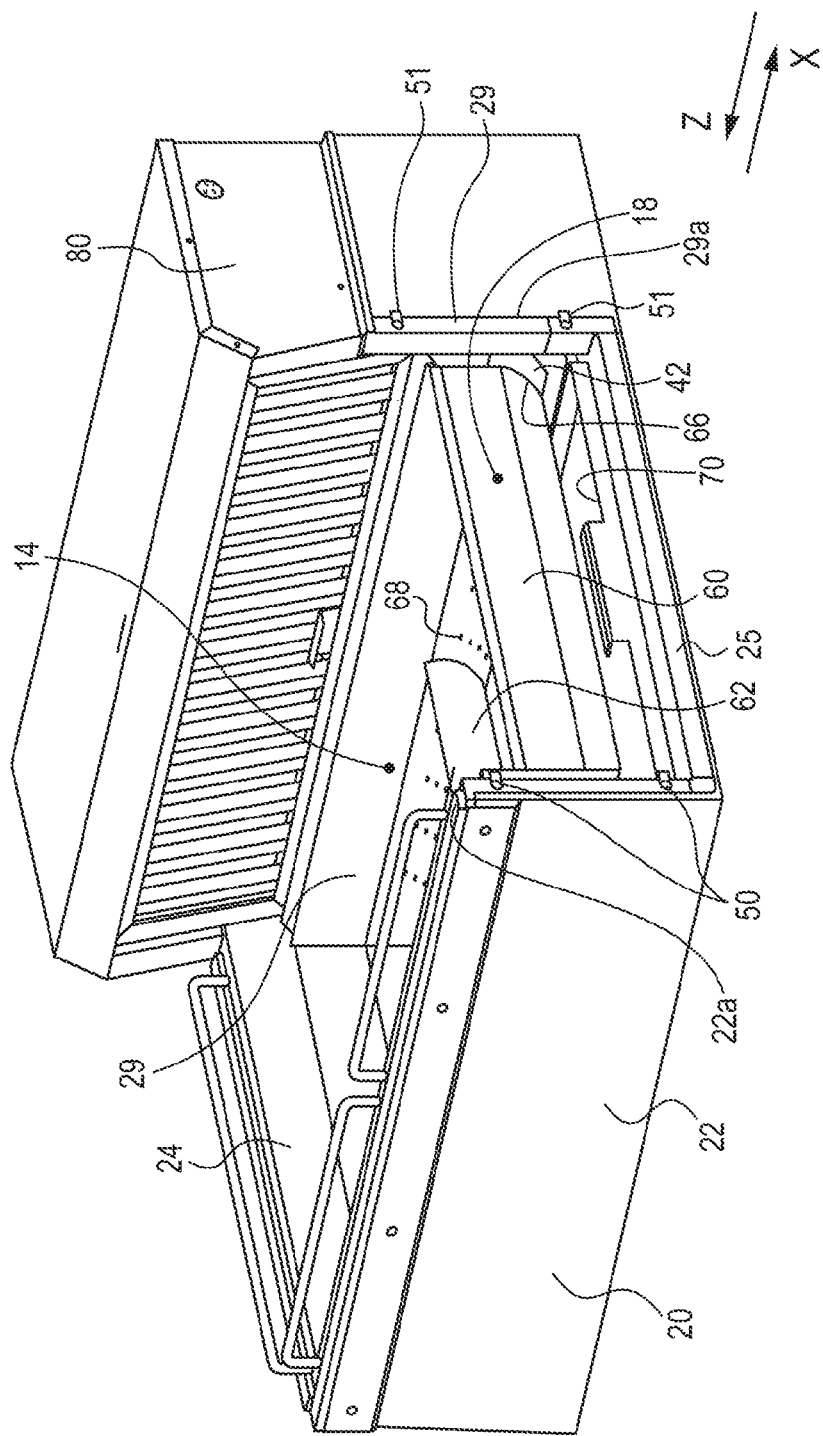
FIG. 2 is the view of FIG. 1 with an end wall removed to form a void.

The removable wall, such as the side wall 26 depicted in the figures, may be fixed with respect to the remainder of the housing 20 such that it is rigidly mounted thereon, but can be easily removed by the user without any tools. When the removable wall 26 is removed a void 18 may be established that communicates with the food storage volume 14, and which allows components to be slid into and out of the food storage volume 14 (through the void 18) in the directions X (out of the food storage volume 14) and Z (into the food storage volume 14) as schematically shown in FIG. 2.

In some embodiments, one or two of the fixed walls, e.g. the first wall 22, which may be the front wall) and the rear wall 29 (or an outer wall that is a portion of the housing 20 or the working chamber 80, discussed below), may support a track 42 along their length, such as their entire length, or a portion of the their length less than their entire length (e.g. 50% of the length, 75%, 80%, 90%, or the like). The track 42 may support a corresponding component 66 that is supported by a food tray 60, such as a track, rollers, wheels, or other structure that is disposed upon a food tray 60 that may be disposed within the food storage volume 14, such that the tray 60 is supported upon and rides upon the track 42. The component 66 may slide upon the track (such as with opposed low friction surfaces on the track 42 and the component 66), or in other embodiments, the component 66 may be a wheel that rolls upon the track 42, but in either construction the tray 60 slides within the food storage volume 14 and through the void 18 (when the removable wall 26 is removed). As best understood with review of FIGS. 2 and 3, the engagement between components 66 of the food tray 60 and the track 42 allow for easy removal and reinsertion of the food tray 60 through the void 18 with the removable wall 26 removed from the housing 20.

In some embodiments, the fixed walls, such as the front wall 22 and the rear 29 may include pegs 50, 51 (or other suitable structures as discussed elsewhere herein) that extend from end faces of the walls 22*a*, 29*a*, with the pegs 50, 51 extending in parallel to a plane 1000 that extends through the length of the front wall 22 (FIG. 3) (or in embodiments wherein the front wall 22 is removable, the pegs 50, 51 extend in parallel to a plane through the wall from which they extend). In some embodiments, four pegs 50, 51 may be provided (such as two sets of two pegs on each wall 22, 29). The pegs 50, 51 may be cylindrical, or another shape, such as rectangular, hexagonal, or an arcuate or planar shape that would be understood by one of ordinary skill in the art to readily slide into and out of an aperture in a wall 26. The term "peg" will be used herein for the sake of brevity, but one of ordinary skill in the art that the peg may be a cylindrical shape or other shapes as discussed herein. As shown in FIG. 4, the pegs 50, 51 may be cylindrical, but include a slot 52 disposed therein with receives a portion of the removable wall 26 when connected thereto. In some embodiments, the pegs 50, 51 may include a uniform cross-section along their length, while in other embodiments the pegs 50, 51 may include a larger cross-section at the tip than the body of the peg.

In some embodiments, the removable wall 26 may include a plurality of apertures 34 that are disposed thereon in locations that are configured to receive each of the plurality of pegs 50, 51 therethrough. In some embodiments, the removable wall 26 may include two opposite end portions 26*a*, 26*b* with each end portion including two apertures 34 disposed therethrough. As best shown in FIG. 1, the apertures 34 are configured to allow the pegs 50, 51 to extend therein, or in some embodiments therethrough (i.e. a tip or more of the peg 50, 51 extends out of the aperture 34).

In some embodiments, the apertures 34 may be round with a diameter just larger than the diameter of the peg 50, 51 that is in registry with the respective aperture 34. In these embodiments, the removable wall 26 is slidably mounted upon the pegs 50, 51. In other embodiments, the apertures 34 may include an upper portion 34*a* with an arcuate inner edge (such as round) with opening width just larger than a diameter of the respective peg 50, 51 and the apertures 34 may additionally include a lower, wider, portion 34*b* with a width that is significantly larger than a diameter of the respective peg 50, 51, such as 25% larger, 50% larger, 100% larger, or another ratio. The apertures 34 are sized and shaped and positioned upon the removable wall 26 such that the removable wall 26 initially engages the pegs 50, 51 (specifically with the pegs 50, 51 extending through the respective apertures 34) with the pegs 50, 51 extending through the lower portion 34*b*, and then when the removable wall 26 is fully assembled, the removable wall 26 is lowered until the pegs 50, 51 extend through the upper portion 34*a* of each aperture 34.

In some embodiments, as shown in FIG. 4, one, some or all of the pegs 50, 51 may include a slot 52 disposed upon an upper facing side surface of each peg 50, 51. The slot 52, when provided, is a recess within the body of the peg and is configured to receive a portion of the removable wall 26, and specifically a portion of the removable wall 26 that is formed above the upper edge 34*c* that defines the upper portion 34*a* of the aperture 34, such that when engaged the removable wall 26 cannot be directly pulled away from the housing in the direction parallel to the longitudinal axis 50*a* of the pegs 50, 51*a*. In embodiments with slots 52 defined in the pegs 50, 51, the removable wall 26 can be removed by first lifting the removable wall 26 upward with respect to the housing 20 (and the pegs 50, 51) to remove engagement of the upper edge 34*c* of the aperture 34 with the slots 52. In some embodiments, it may be preferred to lift the removable wall 26 even further with respect to the pegs 50, 51 until the pegs reside within the wider lower portion 34*b* of the apertures 34 to allow the removable wall 26 to easily be pulled away from the pegs 50, 51 and the housing 20.

As discussed above, a food tray 60 may be provided within the food storage volume 14. The food tray 60 may include one or several compartments 62 for holding food products (such as precooked food) therein until it is removed for further preparation or for presentation to the customer. The food tray 60 may include a plurality of holes 68 in the walls (bottom and or side walls) that allow for drainage of liquids from the food product (potentially into a pan 70 below the food tray, when provided). The holes 68 may additionally allow for air flow therethrough that may be directed to the heat source 100 and the fan 101 (in the direction W, FIG. 5) (potentially located within a working chamber 80) to allow for a loop of air through the housing 20, which may return toward the food tray 60 in the direction T, and potentially again past the food disposed within the food tray in the direction S, wherein the air then flows through the holes 68 and again returns to the working chamber 80 in the direction W.

In some embodiments, the removable wall 26 may include a bar 32 that is disposed above the upper surface 26*d* of the wall 26. The bar 32 may serve various functions, including providing the user with a structure to hold to allow the removable wall 26 to be lifted vertically upward with respect to the housing 20 and specifically the pegs 50, 51 that extend through the apertures 34 in the wall 26, such that when the wall 26 is lifted the pegs 50, 51 extend into the lower (wider) portion 34*b* of the plurality of apertures 34 to allow the wall 26 to be pulled away from the housing 20 in a direction parallel to the longitudinal axes through the pegs 50, 51. In embodiments where the pegs 50, 51 include slots 52, the upward lifting of the wall 26 allows the wall 26 (and specifically the surface 34*c* above the upper portion 34*a* of the aperture 34) to be removed from the slot 52. The bar 32 may define an air gap between the bar 32 and the upper surface 26*d* of the wall 26, which (due to possible air flow therethrough) may provide ambient cooling to the bar 32 to limit the surface temperature of the bar 32 when being manipulated by the user for removal of the removable wall 26 from the housing 20. The bar 32 may also provide a barrier to prevent food product from falling out of the container 10, and specifically the tray 60 when being manipulated by the food service professional. In some embodiments, the walls 22, 24 may also have similar bars.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. A food storage container, comprising:
   a housing comprising a bottom, a first side wall, and a second side wall fixed to the first side wall, wherein a combination of the bottom and the first and second side walls defines a food storage volume therewithin,
   the first side wall extends from a first end portion, wherein the first end portion includes a first peg that extends therefrom in a direction that is parallel with a plane through the first side wall; and
   a third side wall that is removably mounted to the first peg, wherein when mounted to the first peg, the third side wall establishes a barrier of the food storage volume different than barriers of the food storage volume provided by the bottom, the first side wall, and the second side wall,
   wherein the first peg and the third side wall are configured such that the third side wall can be removed from the first peg by first lifting the third side wall upward with respect to the first peg and the housing,
   wherein when the third side wall is removed from the first peg, the food storage volume may be accessed through a void left by a removal of the third side wall,
   wherein the third side wall includes a first aperture that is configured to receive the first peg therethrough and the first aperture includes an upper portion with a width just larger than the first peg and a larger portion with a width that is significantly larger than the first peg, wherein when the third side wall is mounted to the first peg, the first peg resides within the upper portion of the first aperture.

2. The food storage container of claim 1, further comprising a tray disposed within the food storage volume and configured to hold food products disposed therein, wherein when the third side wall is removed from the first peg, the tray is capable of sliding out of the food storage volume through the void.

3. The food storage container of claim 1, wherein the food storage container further comprises a heat source and a fan, wherein the fan when operating directs air heated by the heat source across the food storage volume.

4. The food storage container of claim 3, wherein the heat source and the fan are disposed within a working chamber, and wherein the working chamber is enclosed by an outer wall, wherein the outer wall includes a second peg that extends therefrom in a direction parallel to the first peg.

5. The food storage container of claim 4, wherein the third side wall is removably mounted to both the first peg and the second peg.

6. The food storage container of claim 2, wherein the first side wall supports a track that extends along at least a portion of a length of the food storage volume, wherein the tray rides upon the track to allow the tray to slide through the food storage volume and through the void.

7. The food storage container of claim 1, wherein the bottom supports a pan thereupon within the food storage volume, wherein the pan is configured to be slidably removed from the food storage volume through the void when the third side wall is removed.

8. The food storage container of claim 1, wherein the first peg includes a slot and a portion of the third side wall is disposed within the slot when the third side wall is mounted to the first peg.

9. The food storage container of claim 1, wherein the first peg is able to disengage from the first aperture when the third side wall is lifted with respect to the housing such that the first peg extends within the larger portion of the first aperture.

10. The food storage container of claim 1, wherein the third side wall includes a bar disposed above an upper side surface of the third side wall.

11. The food storage container of claim 1, wherein the first peg has two portions that are spacingly and vertically aligned upon the first side wall.

* * * * *